United States Patent
Zhou et al.

(10) Patent No.: US 10,873,452 B1
(45) Date of Patent: Dec. 22, 2020

(54) SECRET SHARING DATA EXCHANGE FOR GENERATING A DATA PROCESSING MODEL

(71) Applicant: Advanced New Technologies Co., Ltd., Grand Cayman (KY)

(72) Inventors: Yashun Zhou, Hangzhou (CN); Lichun Li, Hangzhou (CN); Shan Yin, Hangzhou (CN); Huazhong Wang, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/792,070

(22) Filed: Feb. 14, 2020

Related U.S. Application Data (63) Continuation of application No. PCT/CN2020/071594, filed on Jan. 11, 2020.

(30) Foreign Application Priority Data

Jul. 1, 2019 (CN) .......................... 2019 1 0583541

(51) Int. Cl.
*H04L 9/08* (2006.01)
*G06F 21/60* (2013.01)
*G06N 20/00* (2019.01)

(52) U.S. Cl.
CPC ............ *H04L 9/085* (2013.01); *G06F 21/606* (2013.01); *G06N 20/00* (2019.01); *H04L 2209/46* (2013.01)

(58) Field of Classification Search
None
See application file for complete search history.

(56) References Cited

U.S. PATENT DOCUMENTS

| 2008/0232580 A1 | 9/2008 | Hosaka et al. |
| 2009/0136024 A1 | 5/2009 | Schneider |

(Continued)

FOREIGN PATENT DOCUMENTS

| CN | 101192928 | 6/2008 |
| CN | 101276524 | 10/2008 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Saleh Najjar
*Assistant Examiner* — Michael W Chao
(74) *Attorney, Agent, or Firm* — Fish & Richardson P.C.

(57) ABSTRACT

This disclosure relates to secret sharing data exchange for generating a data processing model. In some aspects, first data party device determines respective values of first coefficients based on a first share of service data. The first coefficients are corresponding coefficients of respective target variables in different terms of a polynomial expression and the target variables are variables that are in the polynomial expression and associated with the first share of the service data. A second data party device determines respective values of second coefficients based on a second share of the service data. The second coefficients include coefficients other than the first coefficients in the different terms of the polynomial expression. The first data party device secretly shares respective values of the different terms in the polynomial expression in parallel based on the respective values of the first coefficients.

15 Claims, 5 Drawing Sheets

(56) References Cited

U.S. PATENT DOCUMENTS

| | | | |
|---|---|---|---|
| 2012/0151205 A1 | 6/2012 | Raykova et al. | |
| 2015/0372808 A1* | 12/2015 | Bilogrevic | G06N 7/005 |
| | | | 380/279 |
| 2016/0335440 A1* | 11/2016 | Clark | G06F 21/602 |
| 2017/0228547 A1* | 8/2017 | Smith | H04L 63/0428 |
| 2018/0218650 A1* | 8/2018 | Ikarashi | G09C 1/00 |
| 2018/0373834 A1* | 12/2018 | Cho | G16B 50/30 |
| 2018/0373882 A1* | 12/2018 | Veugen | G06F 21/602 |
| 2019/0073608 A1* | 3/2019 | Veeningen | G06F 16/285 |
| 2019/0114530 A1* | 4/2019 | Nishida | H04L 9/085 |
| 2019/0205568 A1* | 7/2019 | Veugen | G06F 7/723 |
| 2019/0266326 A1* | 8/2019 | Furukawa | G06F 21/64 |
| 2019/0311813 A1* | 10/2019 | Hie | G06N 20/00 |
| 2020/0213097 A1* | 7/2020 | Ikarashi | H04L 9/0861 |
| 2020/0213099 A1* | 7/2020 | Wright | H04L 9/3236 |
| 2020/0228325 A1* | 7/2020 | Fan | G06N 20/00 |
| 2020/0242466 A1* | 7/2020 | Mohassel | H04L 9/008 |

FOREIGN PATENT DOCUMENTS

| | | | |
|---|---|---|---|
| CN | 104580174 | 4/2015 | |
| CN | 105049208 | 11/2015 | |
| CN | 106452737 | 2/2017 | |
| CN | 106452745 | 2/2017 | |
| CN | 106453285 | 2/2017 | |
| CN | 108463970 | 8/2018 | |
| CN | 109361513 | 2/2019 | |
| CN | 109787767 | 5/2019 | |
| CN | 110457936 | 11/2019 | |
| JP | 2018054841 | 4/2018 | |
| WO | WO-2018174873 A1 * | 9/2018 | G06F 21/62 |

OTHER PUBLICATIONS

Nakamoto, "Bitcoin: A Peer-to-Peer Electronic Cash System," www.bitcoin.org, 2005, 9 pages.

International Search Report and Written Opinion in PCT Appln No. PCT/CN2020/071594, dated Apr. 1, 2020, 15 pages (with English translation).

Nokoumian, "Generalization of Socio-Rational Secret Sharing with a New Utility Function," in 2014 Twelfth Annual Conference on Privacy, Security, and Trust, dated Jul. 23, 2014, 4 pages.

Dan et al, "Bivariate Polynomial Based Secret Sharing Technology Study", Computer Applications and Software, Jul. 2012, 3 pages (with English abstract).

Bin et al, "The Secret Sharing Scheme Based on Acyclic Polynomial Sequence," in Journal of Sichuan University, May 2014, 5 pages (with English abstract).

* cited by examiner

SECRET SHARING DATA EXCHANGE FOR GENERATING A DATA PROCESSING MODEL

CROSS-REFERENCE TO RELATED APPLICATIONS

This application is a continuation of PCT Application No. PCT/CN2020/071594, filed on Jan. 11, 2020, which claims priority to Chinese Patent Application No. 201910583541.4, filed on Jul. 1, 2019, and each application is hereby incorporated by reference in its entirety.

TECHNICAL FIELD

Implementations of the present specification relate to the field of computer technologies, and in particular, to secret sharing data exchange for generating a data processing model.

BACKGROUND

In the big data era, there are many data silos. Data is usually distributed among different enterprises, and the enterprises do not trust each other completely for the sake of competition and privacy protection. In some cases, the enterprises need to perform cooperative security modeling, so that a data processing model can be cooperatively trained by using data held by the enterprises while data privacy of the enterprises is sufficiently protected.

In the process of cooperatively training the data processing model, parties for cooperative modeling usually need to cooperatively determine a value of a polynomial expression. Therefore, how to quickly determine the value of the polynomial expression on the premise that data privacy is sufficiently protected is a technical problem that needs to be urgently alleviated at present.

SUMMARY

Implementations of the present specification are intended to provide a data exchange method and apparatus and an electronic device, to improve efficiency of determining a value of a polynomial expression on the premise that data privacy is sufficiently protected.

To achieve the previous objective, one or more implementations of the present specification provide the following technical solutions:

According to a first aspect of the one or more implementations of the present specification, a data exchange method is provided, and includes: determining, by a first data party, respective values of first coefficients based on a first share of service data, where the first coefficients are corresponding coefficients of respective target variables in different terms of a polynomial expression, and the target variables are variables that are in the polynomial expression and associated with the first share; determining, by a second data party, respective values of second coefficients based on a second share of the service data, where the second coefficients include coefficients other than the first coefficients in the different terms of the polynomial expression; secretly sharing, by the first data party, respective values of the different terms in the polynomial expression in parallel based on the respective values of the first coefficients, and secretly sharing, by the second data party, the respective values of the different terms in the polynomial expression in parallel based on the respective values of the second coefficients, so that the first data party obtains first shares of the respective values of the different terms, and the second data party obtains second shares of the respective values of the different terms; determining, by the first data party, a first share of a value of the polynomial expression based on the first shares of the respective values of the different terms; and determining, by the second data party, a second share of the value of the polynomial expression based on the second shares of the respective values of the different terms.

According to a second aspect of the one or more implementations of the present specification, a data exchange method is provided, and is applied to a first data party, and includes: determining respective values of target coefficients based on a share of service data that is held by the first data party, where the target coefficients are corresponding coefficients of respective target variables in different terms of a polynomial expression, and the target variables are variables that are in the polynomial expression and associated with the share; secretly sharing respective values of the different terms in the polynomial expression with a cooperator in parallel based on the respective values of the target coefficients, to obtain shares of the respective values of the different terms; and determining a share of a value of the polynomial expression based on the shares of the respective values of the different terms.

According to a third aspect of the one or more implementations of the present specification, a data exchange apparatus is provided, and is disposed in a first data party, and includes: a first determining unit, configured to determine respective values of target coefficients based on a share of service data that is held by the first data party, where the target coefficients are corresponding coefficients of respective target variables in different terms of a polynomial expression, and the target variables are variables that are in the polynomial expression and associated with the share; a secret sharing unit, configured to secretly share respective values of the different terms in the polynomial expression with a cooperator in parallel based on the respective values of the target coefficients, to obtain shares of the respective values of the different terms; and a second determining unit, configured to determine a share of a value of the polynomial expression based on the shares of the respective values of the different terms.

According to a fourth aspect of the one or more implementations of the present specification, an electronic device is provided, and includes: a memory, configured to store a computer instruction; and a processor, configured to execute the computer instruction to implement the method steps according to the second aspect.

According to a fifth aspect of the one or more implementations of the present specification, a data exchange method is provided, and is applied to a second data party, and includes: determining respective values of target coefficients based on a share of service data that is held by the second data party, where the target coefficients include coefficients other than corresponding coefficients of respective target variables in different terms of a polynomial expression, and the target variables are variables that are in the polynomial expression and associated with a share of the service data that is held by a cooperator; secretly sharing respective values of the different terms in the polynomial expression with the cooperator in parallel based on the respective values of the target coefficients, to obtain shares of the respective values of the different terms; and determining a share of a value of the polynomial expression based on the shares of the respective values of the different terms.

According to a sixth aspect of the one or more implementations of the present specification, a data exchange apparatus is provided, and is disposed in a second data party, and includes: a first determining unit, configured to determine respective values of target coefficients based on a share of service data that is held by the second data party, where the target coefficients include coefficients other than corresponding coefficients of respective target variables in different terms of a polynomial expression, and the target variables are variables that are in the polynomial expression and associated with a share of the service data that is held by a cooperator; a secret sharing unit, configured to secretly share respective values of the different terms in the polynomial expression with the cooperator in parallel based on the respective values of the target coefficients, to obtain shares of the respective values of the different terms; and a second determining unit, configured to determine a share of a value of the polynomial expression based on the shares of the respective values of the different terms.

According to a seventh aspect of the one or more implementations of the present specification, an electronic device is provided, and includes: a memory, configured to store a computer instruction; and a processor, configured to execute the computer instruction to implement the method steps according to the fifth aspect.

It can be seen from the technical solutions provided in the implementations of the present specification that in the implementations of the present specification, the first data party and the second data party can secretly share the respective values of the different terms in the polynomial expression in parallel by using a secret sharing algorithm without leaking the shares of the service data that are held by the first data party and the second data party. Therefore, interactions between the first data party and the second data party are reduced, and time occupied for performing network interaction in the secret sharing process is reduced, thereby improving efficiency of determining the value of the polynomial expression.

BRIEF DESCRIPTION OF DRAWINGS

To describe technical solutions in implementations of the present specification or in the existing technology more clearly, the following briefly describes the accompanying drawings needed for describing the implementations or the existing technology. Apparently, the accompanying drawings in the following description merely show some implementations of the present specification, and a person of ordinary skill in the art can further derive other drawings from these accompanying drawings without creative efforts.

DESCRIPTION OF IMPLEMENTATIONS

The following clearly and comprehensively describes the technical solutions in the implementations of the present specification with reference to the accompanying drawings in the implementations of the present specification. Apparently, the described implementations are merely some but not all of the implementations of the present specification. All other implementations obtained by a person of ordinary skill in the art based on the implementations of the present specification without creative efforts shall fall within the protection scope of the present specification. It should be understood that although terms such as "first", "second", and "third" can be used in the present specification to describe various types of information, the information is not limited to these terms. These terms are only used to distinguish between information of the same type. For example, without departing from the scope of the present specification, first information can also be referred to as second information, and similarly, the second information can also be referred to as the first information.

In an example of a related technology, parties for cooperative modeling can include a first data party and a second data party, the first data party can hold a first share of service data, and the second data party can hold a second share of the service data. In the process of cooperatively training a data processing model, the first data party and the second data party need to cooperatively determine a value of polynomial expression $w_0+w_1(e+f)+w_2(e+f)^2$ $w_3(e+f)^3$ $w_4(e+f)^4$, where in the polynomial expression, e represents the first share, f represents the second share, and $w_0$, $w_1$, $w_2$, $w_3$, and $w_4$ represent coefficients of the polynomial expression. Both the first data party and the second data party hold coefficients $w_0$, $w_1$, $w_2$, $w_3$, and $w_4$ of the polynomial expression.

The first data party can locally determine $w_1e$. The second data party can locally determine $w_1f$.

The first data party can determine a value of $w_2(e+f)^2$ through cooperation by using a secret sharing algorithm based on e, and the second data party can determine the value of $w_2(e+f)^2$ through cooperation by using the secret sharing algorithm based on f, so that the first data party can obtain first share $<w_2(e+f)^2>_0$ of the value of $w_2(e+f)^2$, and the second data party can obtain second share $<w_2(e+f)^2>_1$ of the value of $w_2(e+f)^2$.

Then, the first data party can determine a value of $w_3(e+f)^3$ through cooperation by using the secret sharing algorithm based on $w_1e$ and $<w_2(e+f)^2>_0$, and the second data party can determine the value of $w_3(e+f)^3$ through cooperation by using the secret sharing algorithm based on $w_1f$ and $<w_2(e+f)^2>_1$, so that the first data party can obtain first share $<w_3(e+f)^3>_0$ of the value of $w_3(e+f)^3$, and the second data party can obtain second share $<w_3(e+f)^3>_1$ of the value of $w_3(e+f)^3$.

Then, the first data party can determine a value of $w_4(e+f)^4$ through cooperation by using the secret sharing algorithm based on $w_1e$ and $<w_3(e+f)^3>_0$, and the second data party can determine the value of $w_4(e+f)^4$ through cooperation by using the secret sharing algorithm based on $w_1f$ and $<w_3(e+f)^3>_1$, so that the first data party can obtain first share $<w_4(e+f)^4>_0$ of the value of $w_4(e+f)^4$, and the second data party can obtain second share $<w_4(e+f)^4>_1$ of the value of $w_4(e+f)^4$.

The first data party can add $w_1e$, $<w_2(e+f)^2>_0$, $<w_3(e+f)^3>_0$, and $<w_4(e+f)^4>_0$, to obtain a first share of the value of the polynomial expression. The second data party can add $w_0$, $w_1f$, $<w_2(e+f)^2>_1$, $<w_3(e+f)^3>_1$, and $<w_4(e+f)^4>_1$, to obtain a second share of the value of the polynomial expression. The sum of the first share and the second share of the value of the polynomial expression is equal to the value of the polynomial expression.

It can be seen from the previous process of cooperatively determining a value of a polynomial expression that a calculation process of a term having a larger exponent depends on a calculation result of a term having a smaller exponent. The first data party and the second data party need to determine respective values of different terms one by one in ascending order of degrees. As such, the first data party and the second data party need to interact for a plurality times before the value of the polynomial expression can be cooperatively determined. Network interaction is time-consuming, resulting in low efficiency of determining the value of the polynomial expression.

The following describes the technical terms in the implementations of the present specification.

If a product of a plurality of pieces of first data is second data, each piece of first data can be used as a coefficient of the second data. For example, if $z_0 \times z_1 = z$, both $z_0$ and $z_1$ are coefficients of z.

Secure multi-party computation (MPC) is an algorithm for protecting data privacy security. A plurality of participants can perform cooperative calculation by using a secure multi-party computation technology without leaking data held by the participants, to obtain a calculation result. For example, participants $P_1, \ldots,$ and $P_n$ can cooperate to calculate function $f(x_1, \ldots, x_n) = (y_1, \ldots, y_n) = y$ by means of the secure multi-party computation, where $n \geq 2$, $x_1, \ldots,$ and $x_n$ are data held by participants $P_1, \ldots,$ and $P_n$, y is a calculation result, and $y_1, \ldots,$ and $y_n$ are calculated shares of calculation result y that are held by participants $P_1, \ldots,$ and $P_n$.

The secure multi-party computation is widely applied to services in practice. For example, in a cooperative security modeling scenario, to protect data privacy, a plurality of data parties can cooperatively train a data processing model by using the secure multi-party computation technology without leaking data held by the data parties.

Secret sharing (SS) is an algorithm for implementing secure multi-party computation. The idea of the secret sharing algorithm is as follows: Secret information is divided in an appropriate way; shares obtained after division are managed by different participants; and a single participant cannot restore the secret information, and the secret information can be restored only when the several participants cooperate with each other. For example, data party $P_1$ holds data $x_1$, and data party $P_2$ holds data $x_2$. Data party $P_1$ and data party $P_2$ can perform cooperative calculation by using the secret sharing algorithm, to obtain calculation result $y = y_1 + y_2 = f(x_1, x_2) = x_1 x_2$. Data party $P_1$ can obtain share $y_1$ of calculation result y after calculation, and data party $P_2$ can obtain share $y_2$ of calculation result y after calculation.

To facilitate understanding of the technical solutions in the implementations of the present specification, the following first describes an application scenario example. It is worthwhile to note that the application scenario example is merely intended to better understand the implementations of the present specification, and constitutes no improper limitation on the implementations of the present specification.

An activation function can be used to construct a data processing model. The activation function defines an output for a given input. The activation function is usually a non-linear function. As such, a non-linear factor can be added to the data processing model by using the activation function, to improve a representation capability of the data processing model. The activation function can include a Sigmoid function, a Tanh function, a ReLU function, etc. The data processing model can include a machine learning model, such as a logistic regression model, a linear regression model, a neural network model, etc.

In a cooperative security modeling scenario, to protect data privacy, a plurality of data parties can cooperatively train the data processing model based on data held by the data parties by using a secret sharing algorithm without leaking the data held by the data parties. In the process of cooperatively training the data processing model, the plurality of data parties need to cooperatively calculate a value of the activation function by using the secret sharing algorithm. Because an operation involved in the activation function is a non-linear operation, the value of the activation function cannot be directly calculated by using the secret sharing algorithm. Therefore, in practice, a polynomial expression can be used to fit the activation function in the data processing model, and then the polynomial expression instead of the activation function can be used to construct the data processing model. As such, in the process of cooperatively training the data processing model, the plurality of data parties can cooperatively determine a value of the polynomial expression by using the secret sharing algorithm, thereby implementing cooperative training on the data processing model.

The present specification provides an implementation of a data exchange system.

In the present implementation, the data exchange system can include a first data party and a second data party. Each of the first data party and the second data party can be a personal computer, a server, a handheld device, a portable device, a flat panel device, or a multi-processor apparatus, or can be a cluster including any number of apparatuses or devices described above. The first data party and the second data party can be two parties for performing secure multi-party computation. Specifically, each of the first data party and the second data party can hold a share of service data. For ease of description, a share held by the first data party can be used as a first share, and a share held by the second data party can be used as a second share. The sum of the first share and the second share of the service data is equal to the service data. The first data party can determine a value of a polynomial expression through cooperation by using a secret sharing algorithm based on the first share of the service data that is held by the first data party, and the second data party can determine the value of the polynomial expression through cooperation by using the secret sharing algorithm based on the second share of the service data that is held by the second data party. In this process, the first data party cannot leak the first share of the service data that is held by the first data party, and the second data party cannot leak the second share of the service data that is held by the second data party.

The present specification provides an implementation of a data exchange method.

Figure 1:
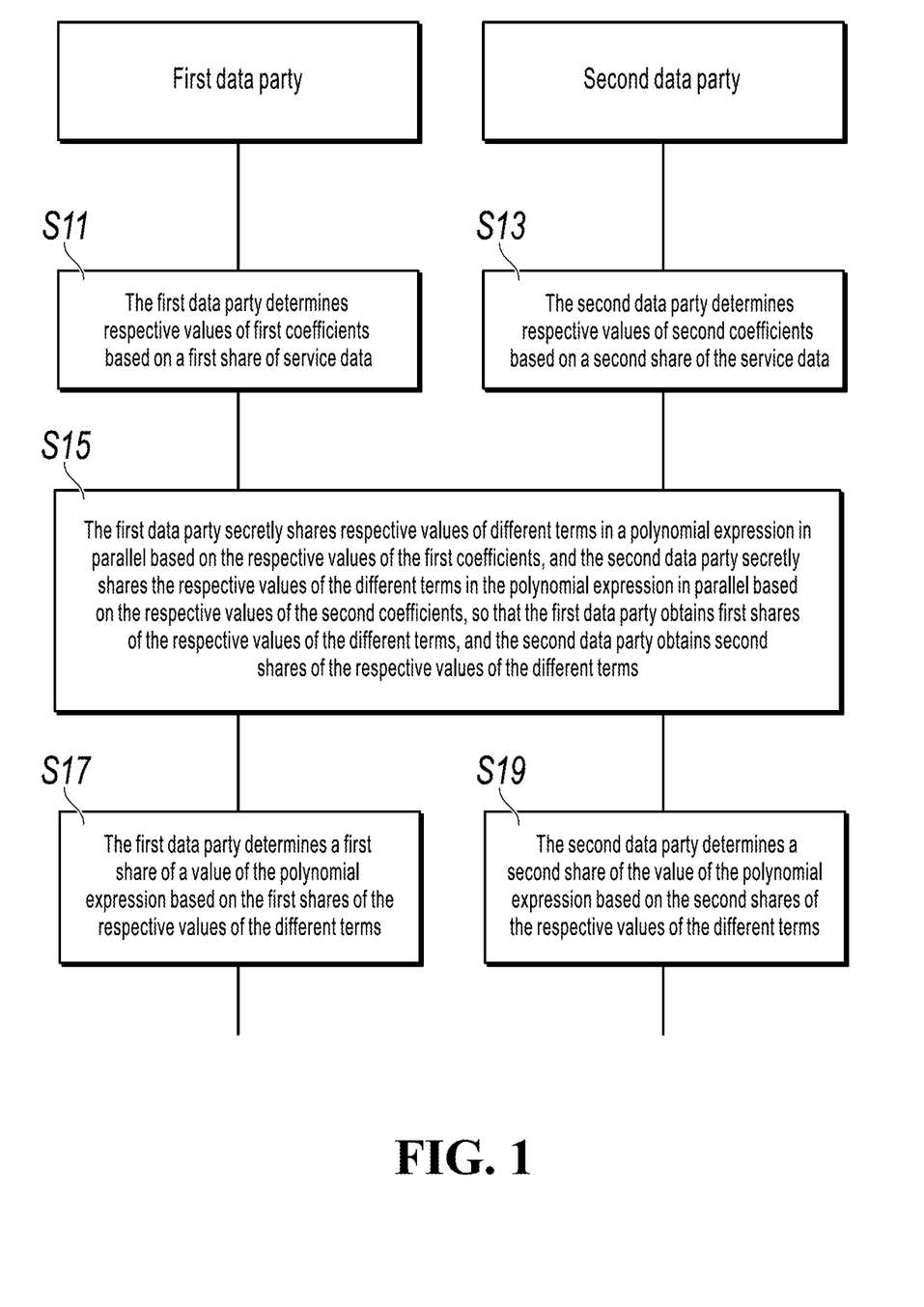
FIG. 1 is a flowchart illustrating a data exchange method, according to an implementation of the present specification.

Referring to FIG. 1, the present implementation can include the following steps.

Step S11: A first data party determines respective values of first coefficients based on a first share of service data, where the first coefficients are corresponding coefficients of respective target variables in different terms of a polynomial expression, and the target variables are variables that are in the polynomial expression and associated with the first share.

Step S13: A second data party determines respective values of second coefficients based on a second share of the service data, where the second coefficients include coefficients other than the first coefficients in the different terms of the polynomial expression.

Step S15: The first data party secretly shares respective values of the different terms in the polynomial expression in parallel based on the respective values of the first coefficients, and the second data party secretly shares the respective values of the different terms in the polynomial expression in parallel based on the respective values of the second coefficients, so that the first data party obtains first shares of the respective values of the different terms, and the second data party obtains second shares of the respective values of the different terms.

Step S17: The first data party determines a first share of a value of the polynomial expression based on the first shares of the respective values of the different terms.

Step S19: The second data party determines a second share of the value of the polynomial expression based on the second shares of the respective values of the different terms.

In some implementations, the service data can be any type of data, for example, can be transaction data or asset data. The first data party can hold the first share of the service data, and the second data party can hold the second share of the service data. The sum of the first share and the second share of the service data is equal to the service data. Only the second data party can hold coefficients of the polynomial expression. Alternatively, both the first data party and the second data party can hold coefficients of the polynomial expression.

The polynomial expression can include a plurality of variables. The plurality of variables can include a variable associated with the first share of the service data and at least one other variable. The association of a variable with a share of the service data can be understood as that the variable is used to represent the share of the service data. For example, the polynomial expression can include two variables, one of the two variables can be associated with the first share of the service data, and the other can be associated with the second share of the service data. For ease of description, the variable associated with the first share of the service data can be used as the target variable in a subsequent process.

The polynomial expression can include a plurality of terms, and the sum of the plurality of terms is equal to the polynomial expression. The terms can include the first coefficients and the second coefficients, and products of the first coefficients and the second coefficients are equal to the terms. The first coefficients can be the corresponding coefficients of the respective target variables in the different terms, and the second coefficients can include coefficients other than the first coefficients in the different terms. It is worthwhile to note that in practice, the polynomial expression can be expressed in different ways, and the term is differently expressed in different expression ways. Here, the polynomial expression can be expressed in a way of obtaining the term through division based on a degree of the target variable. Therefore, target variables in different terms have different degrees.

In some scenario examples, polynomial expression p can be expressed as follows:

$$p = w_0 + w_1 x + w_2 x^2 + \ldots + w_i x^i + \ldots + w_n x^n$$
$$= w_0 + w_1(a+b) + w_2(a+b)^2 + \ldots +$$
$$w_i(a+b)^i + \ldots + w_n(a+b)^n$$
$$= w_0 + w_1(a+b) + w_2(a^2 + 2ab + b^2) + \ldots$$
$$w_i(a^i + \ldots + b^i) + \ldots + w_n(a^n + \ldots + b^n)$$
$$= a^n f_n(b) + \ldots + a^j f_j(b) + \ldots +$$
$$a^2 f_2(b) + a f_1(b) + f_0(b),$$

where x represents the service data;
a represents the first share of the service data;
b represents the second share of the service data;
a and b are two variables in the polynomial expression;
n represents the highest degree of the polynomial expression;
$w_i$ represents a coefficient of the polynomial expression;
polynomial expression p is divided into terms based on the degree of target variable a, and $a^i f_i(b)$ represents a term; $a^i$ is a coefficient of respective target variable a in term $a^i f_i(b)$, in other words, $a^i$ is a first coefficient of term $a^i f_i(b)$, where it is worthwhile to note that the first coefficient of term $f_0(b)$ can be understood as that $a^0=1$; and $f_i(b)$ is a second coefficient of term $a^i f_i(b)$.

In some implementations, in step S11, the first data party can calculate the respective values of the first coefficients of the different terms in the polynomial expression based on the first share of the service data that is held by the first data party. Continuing with the previous scenario example, in practice, $a^0=1$ and $a^1=a$ can be directly determined, and therefore the first data party can calculate values of first coefficients other than $a^0$ and $a^1$ based on a, for example, values of $a^n, \ldots, a^i, \ldots,$ and $a^2$.

In some implementations, in step S13, the second data party can calculate the respective values of the second coefficients of the different terms in the polynomial expression based on the second share of the service data that is held by the second data party. Continuing the previous scenario example, the second data party can calculate values of $f_n(b), \ldots, f_i(b), \ldots, f_2(b), f_1(b)$, and $f_0(b)$ based on b.

To calculate the respective values of the coefficients, both parties can expand the terms of the polynomial expression and merge like terms, e.g., terms having the same exponents of each variable a and b. The first party can then determine the values of the first coefficients as a function of the second coefficients. Since the first party knows the value of a, the first party can compute the values of the first coefficients for each second coefficient with the second coefficient being unknown to the first party. Similarly, since the second party knows the value of b, the second party can compute the values of the second coefficients for each first coefficient with the first coefficient being unknown to the second party.

In some implementations, the respective values of the first coefficients of the different terms are independent of each other (a value of a first coefficient of each term does not depend on a value of a first coefficient of another term), and the respective values of the second coefficients of the different terms are also independent of each other (a value of a second coefficient of each term does not depend on a value of a second coefficient of another term). Therefore, in step S15, the first data party can secretly share the respective values of the different terms in the polynomial expression in parallel (e.g., at the same time) based on the respective values of the first coefficients, and the second data party can secretly share the respective values of the different terms in the polynomial expression in parallel (e.g., at the same time) based on the respective values of the second coefficients, so that each of the first data party and the second data party can obtain shares of the respective values of the different terms in the polynomial expression. For ease of description, shares that are of the respective values of the different terms and obtained by the first data party can be used as the first shares, and shares that are of the respective values of the different terms and obtained by the second data party can be used as the second shares. The sum of the first share and the second share of the value of each term is equal to the value of the term. Interactions between the first data party and the second data party can be reduced in the parallel way, so that efficiency of calculating a value of the polynomial expression can be improved.

The first data party and the second data party can secretly share the respective values of the different terms in the polynomial expression in parallel by using any appropriate secret sharing method. The respective values of the different terms in the polynomial expression can be secretly shared in parallel if the respective values of the first coefficients of the different terms in the polynomial expression are used as a whole to participate in secret sharing calculation, and the respective values of the second coefficients of the different terms in the polynomial expression are used as a whole to participate in secret sharing calculation. Therefore, in practice, the first data party can construct a first coefficient value vector based on the respective values of the first coefficients of the different terms in the polynomial expression, and the second data party can construct a second coefficient value vector based on the respective values of the second coefficients of the different terms in the polynomial expression. As such, the value of the polynomial expression can be represented as a dot product of the first coefficient vector and the second coefficient vector. The first data party can secretly share the respective values of the different terms in the polynomial expression based on the first coefficient value vector, and the second data can secretly share the respective values of the different terms in the polynomial expression based on the second coefficient value vector, the first data party can obtain the first shares of the respective values of the different terms, and the second data party can obtain the second shares of the respective values of the different terms. As such, in the method of using a vector, the first data party and the second data party can cooperatively determine the value of the polynomial expression by interacting with each other for one time.

Continuing the previous scenario example, the first data party can construct first coefficient value vector $v1=[a^n, \ldots, a^i, \ldots, a^2, a^1, 1]$, and the second data party can construct second coefficient value vector $v2=[f_n(b), \ldots, f_i(b), \ldots, f_2(b), f_1(b), f_0(b)]$. The first data party can secretly share the respective values of the different terms in the polynomial expression based on the first coefficient value vector, and the second data can secretly share the respective values of the different terms in the polynomial expression based on the second coefficient value vector, so that the first data party can obtain first shares $<a^n f_n(b)>_0, \ldots, <a^i f_i(b)>_0, \ldots, <a^2 f_2(b)>_0, <a f_1(b)>_0$, and $<f_0(b)>_0$ of the respective values of the different terms, and the second data party can obtain second shares $<a^n f_n(b)>_1, \ldots, <a^i f_i(b)>_1, \ldots, <a^2 f_2(b)>_1, <a f_1(b)>_1$, and $<f_0(b)>_1$ of the respective values of the different terms, where $<a^n f_n(b)>_0 + <a^n f_n(b)>_1 = a^n f_n(b)$, $<a^i f_i(b)>_0 + <a^i f_i(b)>_1 = a^i f_i(b)$, $<a^2 f_2(b)>_0 + <a^2 f_2(b)>_1 = f_2(b)$, $<a f_1(b)>_0 + <a f_1(b)>_1 = a f_1(b)$, $<f_0(b)>_0 + <f_0(b)>_1 = f_0(b)$.

In some implementations, for the first data party to obtain the first shares and the second data party to obtain the second shares, the secret sharing method can calculate the products of the first coefficients and the corresponding second coefficients and provide first shares of the products to the first data party and second chares of the products to the second data party.

In some implementations, in step S17, the first data party can add the first shares of the respective values of the different terms in the polynomial expression, to obtain the first share of the value of the polynomial expression.

Continuing the previous scenario example, the first data party can add first shares $<a^n f_n(b)>_0, \ldots, <a^i f_i(b)>_0, \ldots, <a^2 f_2(b)>_0, <a f_1(b)>_0$, and $<f_0(b)>_0$ of the respective values of the different terms in the polynomial expression, to obtain first share $<p>_0$ of the value of the polynomial expression, where $<p>_0 = <a^n f_n(b)>_0 + \ldots + <a^i f_i(b)>_0 + \ldots + <a^2 f_2(b)>_0 + <a f_1(b)>_0 + <f_0(b)>_0$.

In some implementations, in step S19, the second data party can add the second shares of the respective values of the different terms in the polynomial expression, to obtain the second share of the value of the polynomial expression.

Continuing the previous scenario example, the second data party can add second shares $<a^n f_n(b)>_1, \ldots, <a^i f_i(b)>_1, \ldots, <a^2 f_2(b)>_1, <a f_1(b)>_1$, and $<f_0(b)>_1$ of the respective values of the different terms in the polynomial expression, to obtain second share $<p>_1$ of the value of the polynomial expression, where $<p>_0 + <p>_1 = p$, and $<p>_1 = <a^n f_n(b)>_1 + \ldots + <a^i f_i(b)>_1 + \ldots + <a^2 f_2(b)>_1 + <a f_1(b)>_1 + <f_0(b)>_1$.

According to the data exchange method in the present implementation, the first data party and the second data party can secretly share the respective values of the different terms in the polynomial expression in parallel by using a secret sharing algorithm without leaking the shares of the service data that are held by the first data party and the second data party. Therefore, interactions between the first data party and the second data party are reduced, and time occupied for performing network interaction in the secret sharing process is reduced, thereby improving efficiency of calculating the value of the polynomial expression.

One or both data parties can then determine the full polynomial expression using both the first shares of the polynomial expression and the second shares of the polynomial expression. The data parties can then use the polynomial expression to generate the data processing model, e.g., by using the polynomial expression to fit the activation function in the data processing model.

Figure 2:
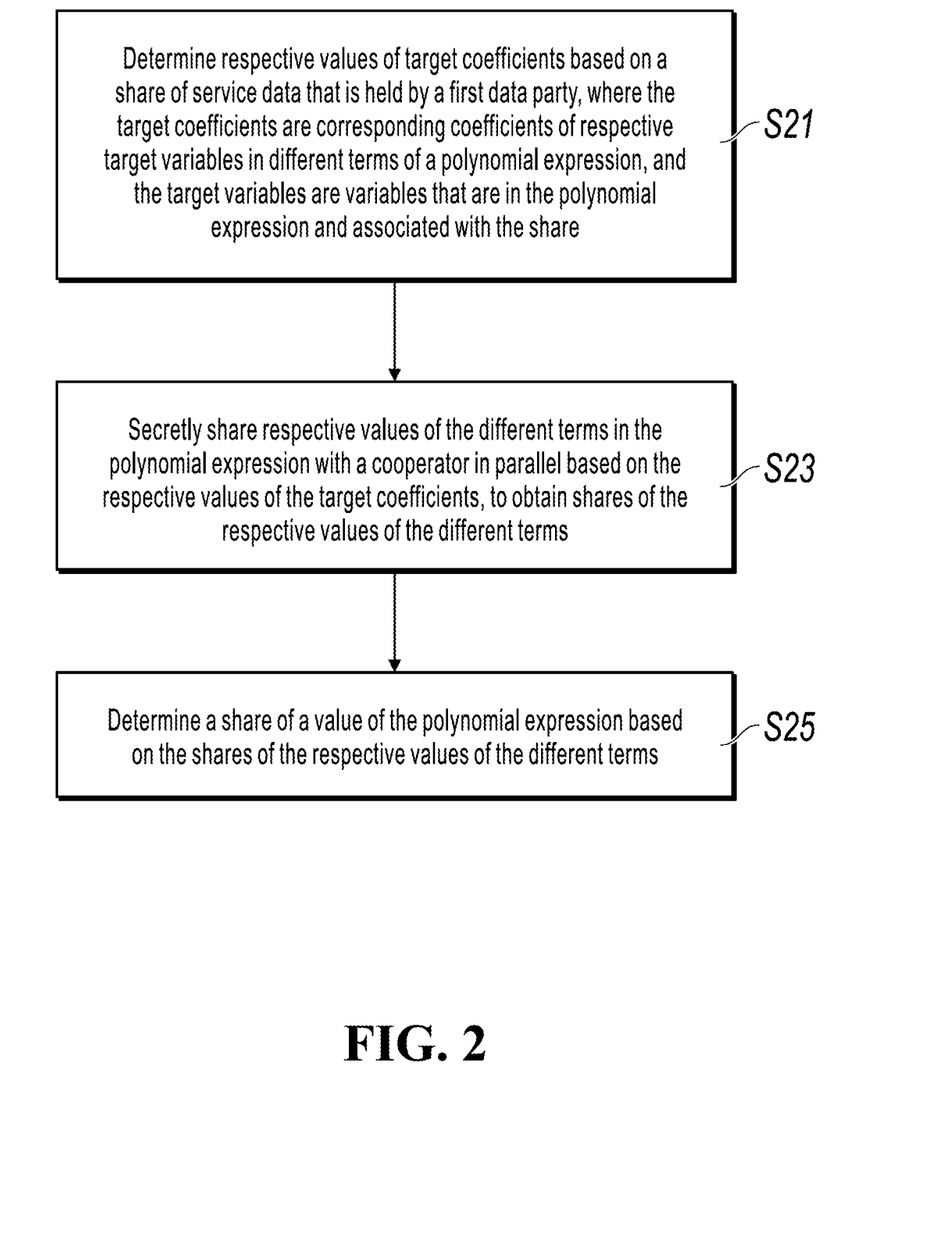
FIG. 2 is a flowchart illustrating a data exchange method, according to an implementation of the present specification.

Based on the same inventive concept, the present specification further provides another implementation of a data exchange method. In the present implementation, a first data party is used as an execution body. The first data party can hold a share of service data. Referring to FIG. 2, the present implementation can include the following steps:

Step S21: Determine respective values of target coefficients based on the share of the service data that is held by the first data party, where the target coefficients are corresponding coefficients of respective target variables in different terms of a polynomial expression, and the target variables are variables that are in the polynomial expression and associated with the share.

For description of the target coefficients, references can be made to the description of the first coefficients in the previous implementation. The first data party can calculate the respective values of the target coefficients of the different terms in the polynomial expression based on the share of the service data that is held by the first data party. For a detailed process, references can be made to step S11 in the previous implementation.

Step S23: Secretly share respective values of the different terms in the polynomial expression with a cooperator in parallel based on the respective values of the target coefficients, to obtain shares of the respective values of the different terms.

The cooperator can be understood as a data party that cooperates with the first data party to determine a value of the polynomial expression, and can be specifically the previous second data party. The first data party can secretly share the respective values of the different terms in the polynomial expression in parallel based on the respective values of the target coefficients, so that the first data party can obtain the shares of the respective values of the different terms in the polynomial expression. For a detailed process, references can be made to step S15 in the previous implementation.

Step S25: Determine a share of the value of the polynomial expression based on the shares of the respective values of the different terms.

The first data party can add the shares of the respective values of the different terms in the polynomial expression, to obtain the share of the value of the polynomial expression. For a detailed process, references can be made to step S17 in the previous implementation.

According to the data exchange method in the present implementation, the first data party can secretly share the respective values of the different terms in the polynomial expression with the cooperator in parallel by using a secret sharing algorithm without leaking the share of the service data that is held by the first data party. Therefore, interactions between the first data party and the second data party are reduced, and time occupied for performing network interaction in the secret sharing process is reduced, thereby improving efficiency of calculating the value of the polynomial expression.

Figure 3:
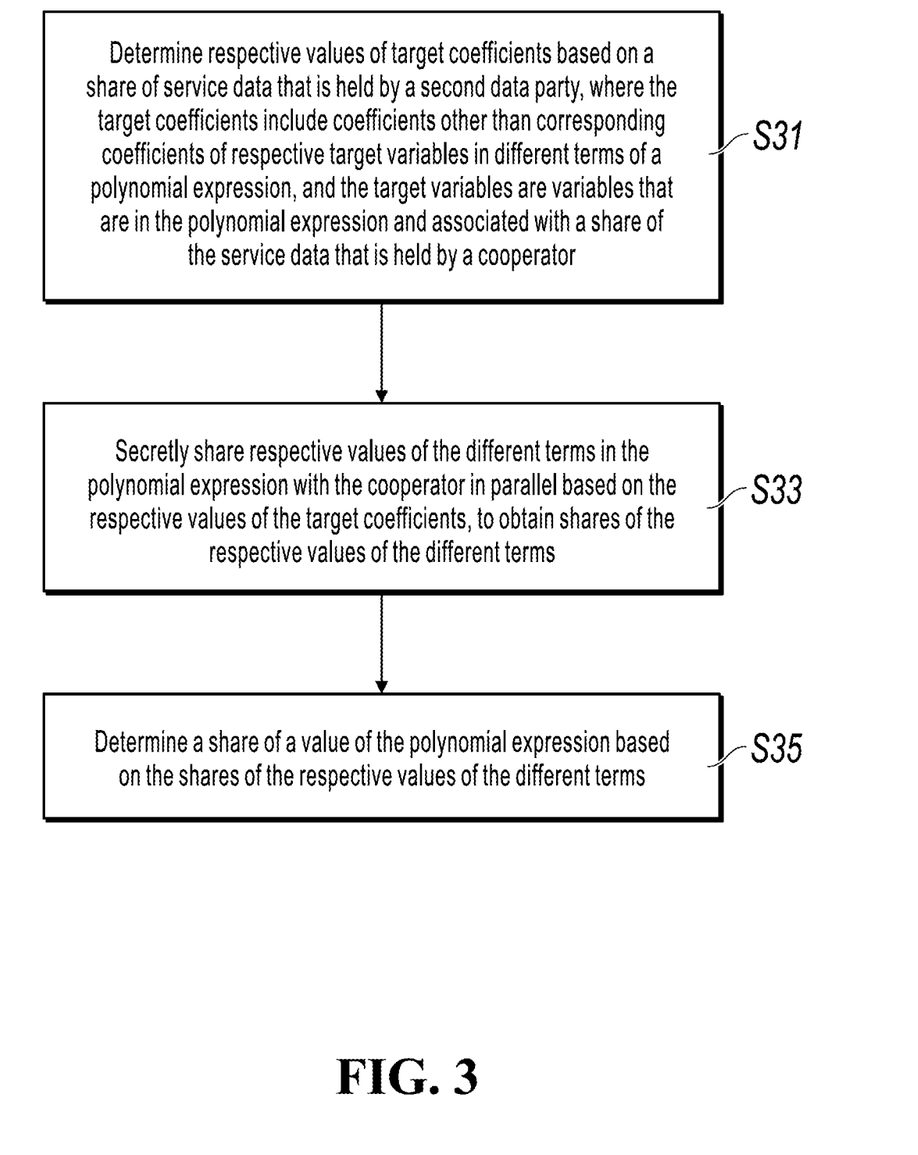
FIG. 3 is a flowchart illustrating a data exchange method, according to an implementation of the present specification.

Based on the same inventive concept, the present specification further provides another implementation of a data exchange method. In the present implementation, a second data party is used as an execution body. The second data party can hold a share of service data. Referring to FIG. 3, the present implementation can include the following steps:

Step S31: Determine respective values of target coefficients based on the share of the service data that is held by the second data party, where the target coefficients include coefficients other than corresponding coefficients of respective target variables in different terms of a polynomial expression, and the target variables are variables that are in the polynomial expression and associated with a share of the service data that is held by a cooperator.

For description of the target coefficients, references can be made to the description of the second coefficients in the previous implementation. The second data party can calculate the respective values of the target coefficients of the different terms in the polynomial expression based on the share of the service data that is held by the second data party. For a detailed process, references can be made to step S13 in the previous implementation.

Step S33: Secretly share respective values of the different terms in the polynomial expression with the cooperator in parallel based on the respective values of the target coefficients, to obtain shares of the respective values of the different terms.

The cooperator can be understood as a data party that cooperates with the second data party to determine a value of the polynomial expression, and can be specifically the previous first data party. The second data party can secretly share the respective values of the different terms in the polynomial expression in parallel based on the respective values of the target coefficients, so that the second data party can obtain the shares of the respective values of the different terms in the polynomial expression. For a detailed process, references can be made to step S15 in the previous implementation.

Step S35: Determine a share of the value of the polynomial expression based on the shares of the respective values of the different terms.

The second data party can add the shares of the respective values of the different terms in the polynomial expression, to obtain the share of the value of the polynomial expression. For a detailed process, references can be made to step S19 in the previous implementation.

According to the data exchange method in the present implementation, the second data party can secretly share the respective values of the different terms in the polynomial expression with the cooperator in parallel by using a secret sharing algorithm without leaking the share of the service data that is held by the second data party. Therefore, interactions between the first data party and the second data party are reduced, and time occupied for performing network interaction in the secret sharing process is reduced, thereby improving efficiency of calculating the value of the polynomial expression.

Figure 4:
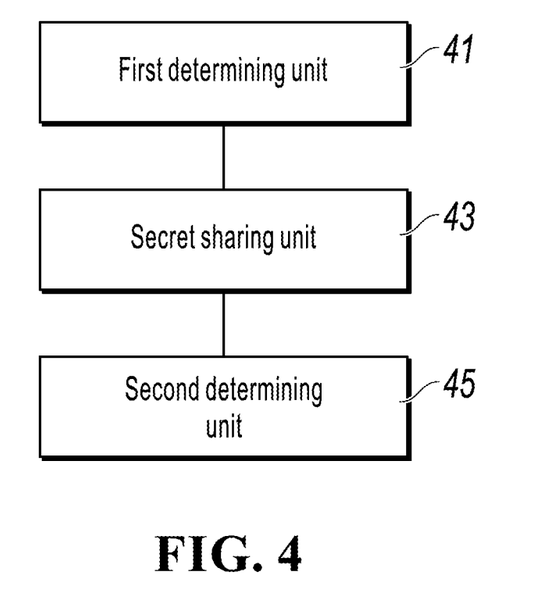
FIG. 4 is a schematic diagram illustrating a functional structure of a data exchange apparatus, according to an implementation of the present specification.

Based on the same inventive concept, the present specification further provides an implementation of a data exchange apparatus. Referring to FIG. 4, in the present implementation, the apparatus can be disposed in a first data party, and can specifically include: a first determining unit 41, configured to determine respective values of target coefficients based on a share of service data that is held by the first data party, where the target coefficients are corresponding coefficients of respective target variables in different terms of a polynomial expression, and the target variables are variables that are in the polynomial expression and associated with the share; a secret sharing unit 43, configured to secretly share respective values of the different terms in the polynomial expression with a cooperator in parallel based on the respective values of the target coefficients, to obtain shares of the respective values of the different terms; and a second determining unit 45, configured to determine a share of a value of the polynomial expression based on the shares of the respective values of the different terms.

Figure 5:
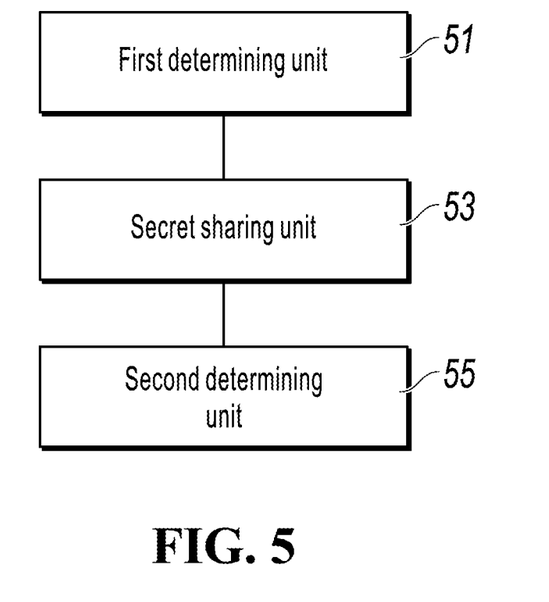
FIG. 5 is a schematic diagram illustrating a functional structure of a data exchange apparatus, according to an implementation of the present specification.

Based on the same inventive concept, the present specification further provides an implementation of a data exchange apparatus. Referring to FIG. 5, in the present implementation, the apparatus can be disposed in a second data party, and can specifically include: a first determining unit 51, configured to determine respective values of target coefficients based on a share of service data that is held by the second data party, where the target coefficients include coefficients other than corresponding coefficients of respective target variables in different terms of a polynomial expression, and the target variables are variables that are in the polynomial expression and associated with a share of the service data that is held by a cooperator; a secret sharing unit 53, configured to secretly share respective values of the different terms in the polynomial expression with the cooperator in parallel based on the respective values of the target coefficients, to obtain shares of the respective values of the different terms; and a second determining unit 55, configured to determine a share of a value of the polynomial expression based on the shares of the respective values of the different terms.

Figure 6:
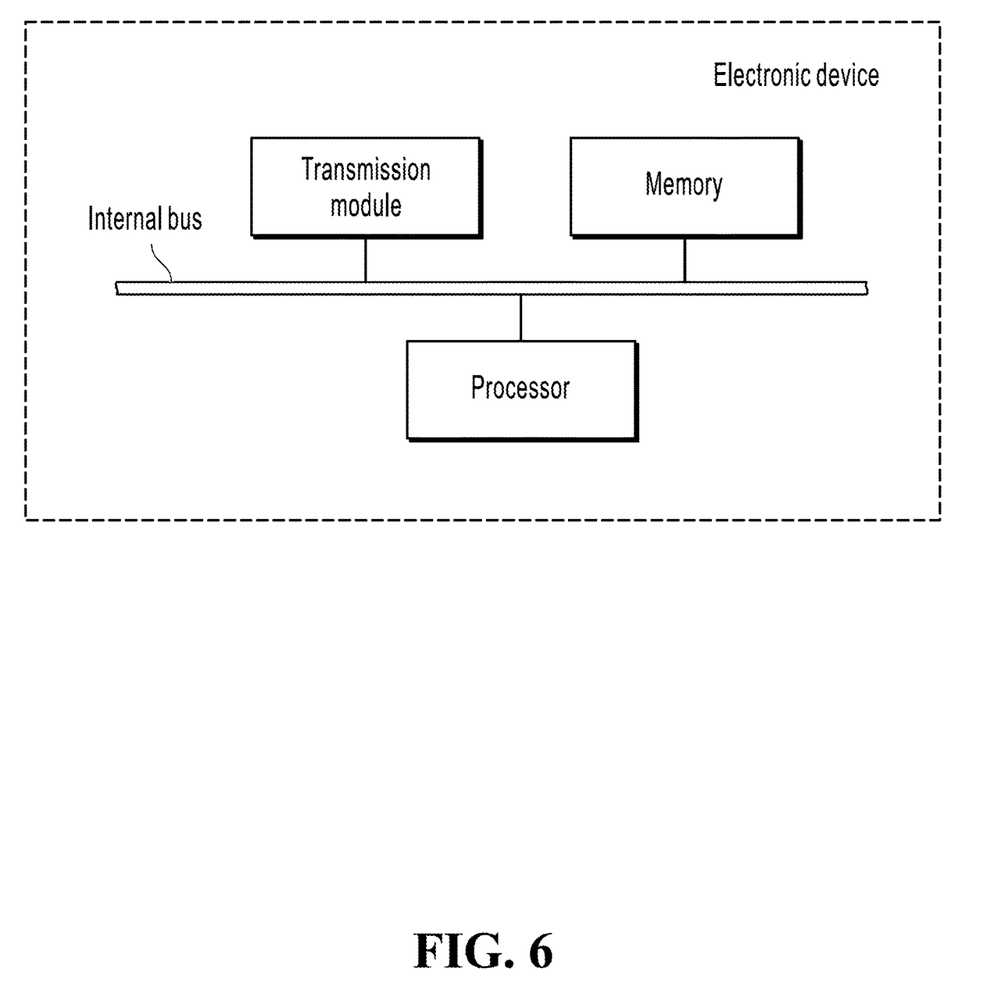
FIG. 6 is a schematic diagram illustrating a functional structure of an electronic device, according to an implementation of the present specification.

The following describes an implementation of an electronic device in the present specification. FIG. 6 is a schematic diagram illustrating a hardware structure of an electronic device, according to an embodiment of the present implementation. As shown in FIG. 6, the electronic device can include one or more processors (only one processor is shown in the figure), a memory, and a transmission module. Certainly, a person of ordinary skill in the art can understand that the hardware structure shown in FIG. 6 is merely an example, and constitute no limitation on the hardware structure of the electronic device. In practice, the electronic device can include more or fewer component units than those shown in FIG. 6, or have a configuration different from that shown in FIG. 6.

The memory can include a high-speed random access memory, or can include a nonvolatile memory, for example, one or more magnetic storage apparatuses, a flash memory, or another nonvolatile solid-state memory. Certainly, the memory can further include a remotely disposed network memory. The remotely disposed network memory can be connected to the electronic device by using a network such as the Internet, an intranet, a local area network, or a mobile communications network. The memory can be configured to store a program instruction or a module of application software, for example, a program instruction or a module in the implementation corresponding to FIG. 2 in the present specification, and/or a program instruction or a module in the implementation corresponding to FIG. 3 in the present specification.

The processor can be implemented in any appropriate way. For example, the processor can be a microprocessor, a processor, or a computer readable medium, a logic gate, a switch, an application-specific integrated circuit (ASIC), a programmable logic controller, or a built-in microcontroller that stores computer readable program code (for example, software or firmware) that can be executed by the processor or the microprocessor. The processor can read and execute the program instruction or the module in the memory.

The transmission module can be configured to transmit data by using a network such as the Internet, an intranet, a local area network, or a mobile communications network.

It is worthwhile to note that the implementations of the present specification are described in a progressive way. For the same or similar parts in the implementations, references can be made to the implementations. Each implementation focuses on a difference from other implementations. In particular, the apparatus implementation and the electronic device implementation are basically similar to the method implementation, and therefore are briefly described. For related parts, references can be made to partial description of the method implementation. In addition, it can be understood that a person skilled in the art can think of any combination of some or all of the implementations enumerated in the present specification without creative efforts after reading the specification document. These combinations also fall within the protection scope of the present specification.

In the 1990s, whether a technical improvement is a hardware improvement (for example, an improvement to a circuit structure such as a diode, a transistor, or a switch) or a software improvement (an improvement to a method procedure) can be clearly distinguished. However, as technologies develop, current improvements to many method procedures can be considered as direct improvements to hardware circuit structures. A designer usually programs an improved method procedure into a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the PLD is determined by a user through device programming. The designer performs programming to "integrate" a digital system to a single PLD, without requiring a chip manufacturer to design and manufacture dedicated application-specific integrated circuit chip 2. In addition, the programming is mostly implemented by modifying "logic compiler" software instead of manually making an integrated circuit chip. This is similar to a software compiler used for program development and compiling. However, original code before compiling is also written in a specific programming language, which is referred to as a hardware description language (HDL). There are many HDLs, such as an Advanced Boolean Expression Language (ABEL), an Altera Hardware Description Language (AHDL), Confluence, a Cornell University Programming Language (CUPL), HDCal, a Java Hardware Description Language (JHDL), Lava, Lola, MyHDL, PALASM, and a Ruby Hardware Description Language (RHDL). Currently, a Very-High-Speed Integrated Circuit Hardware Description Language (VHDL) and Verilog2 are most commonly used. A person skilled in the art should also understand that a hardware circuit that implements a logical method procedure can be readily obtained once the method procedure is logically programmed by using the several described hardware description languages and is programmed into an integrated circuit.

The system, apparatus, module, or unit illustrated in the previous implementations can be specifically implemented by using a computer chip or an entity, or can be implemented by using a product having a certain function. A typical implementation device is a computer. Specifically, the computer can be, for example, a personal computer, a laptop computer, a cellular phone, a camera phone, a smartphone, a personal digital assistant, a media player, a navigation device, an email device, a game console, a tablet computer, or a wearable device, or a combination of any of these devices.

It can be seen from the description of the implementations that a person skilled in the art can clearly understand that the present specification can be implemented by using software and a necessary general hardware platform. Based on such an understanding, the technical solutions in the present specification essentially or the part contributing to the existing technology can be implemented in a form of a software product. The computer software product can be stored in a storage medium such as a ROM/RAM, a magnetic disk, or an optical disc, and includes several instructions for instructing a computer device (which can be a personal computer, a server, a network device, etc.) to perform the methods described in the implementations or in some parts of the implementations of the present specification.

The implementations of the present specification are described in a progressive way. For the same or similar parts of the implementations, references can be made to the implementations. Each implementation focuses on a difference from other implementations. In particular, the system implementation is basically similar to the method implementation, and therefore is briefly described. For related parts, references can be made to partial description of the method implementation.

The present specification can be applied to many general-purpose or dedicated computer system environments or configurations, for example, a personal computer, a server computer, a handheld device or a portable device, a flat panel device, a multi-processor system, a microprocessor-based system, a set-top box, a programmable consumption electronic device, a network PC, a minicomputer, a mainframe computer, and a distributed computing environment including any one of the previous systems or devices.

The present specification can be described in the general context of computer-executable instructions, for example, a program module. The program module usually includes a routine, a program, an object, a component, a data structure, etc. for executing a specific task or implementing a specific abstract data type. The present specification can be alternatively practiced in distributed computing environments in which tasks are executed by remote processing devices that are connected by using a communications network. In the distributed computing environment, the program module can be located in both local and remote computer storage media including storage devices.

Although the present specification is described by using the implementations, a person of ordinary skill in the art knows that many modifications and variations can be made to the present specification without departing from the spirit of the present specification. It is expected that the appended claims include these modifications and variations without departing from the spirit of the present specification.

What is claimed is:

1. A computer-implemented data exchange method, comprising:
   determining, by a first data party device, respective values of first coefficients based on a first share of service data, wherein the first coefficients are corresponding coefficients of respective target variables in different terms of a polynomial expression, and the target variables are variables that are in the polynomial expression and associated with the first share of the service data;
   determining, by a second data party device, respective values of second coefficients based on a second share of the service data, wherein the second coefficients comprise coefficients of the target variables other than the first coefficients in the different terms of the polynomial expression, wherein the first coefficients are expressed in terms of multiple orders of the second coefficients and the second coefficients are expressed in terms of multiple orders of the first coefficients;
   secretly sharing, by the first data party device, respective values of the different terms in the polynomial expression in parallel based on the respective values of the first coefficients, and secretly sharing, by the second data party, the respective values of the different terms in the polynomial expression in parallel based on the respective values of the second coefficients, so that the first data party obtains first shares of the respective values of the different terms, and the second data party obtains second shares of the respective values of the different terms;
   determining, by the first data party device a first share of a value of the polynomial expression based on the first shares of the respective values of the different terms; and
   determining, by the second data party device, a second share of the value of the polynomial expression based on the second shares of the respective values of the different terms
   determining by at least one of the first party device or the second party device, the value of the polynomial expression based on the first share of the value of the polynomial expression and the second share of the value of the polynomial expression; and
   constructing a machine learning model by fitting an activation function of the machine learning model using the value of the polynomial expression.

2. The computer-implemented method of claim 1, wherein:
   a sum of the first share of the service data and the second share of the service data is equal to the service data;
   products of the first coefficients and the second coefficients of the different terms are equal to the different terms;
   the sum of the first shares and the second shares of the respective values of the different terms is equal to the respective values of the different terms;
   the sum of the first share and the second share of the value of the polynomial expression is equal to the value of the polynomial expression; and
   the polynomial expression comprises a plurality of terms, and target variables in different terms have different degrees.

3. The computer-implemented method of claim 1, wherein the activation function comprises a non-linear function.

4. The computer-implemented method of claim 1, wherein secretly sharing, by the first data party device, respective values of the different terms in the polynomial expression comprises transmitting secret shares of the respective values of the different in the polynomial expression to the second data party at a first same time and without multiple exchanges with the second data party device.

5. The computer-implemented method of claim 4, wherein secretly sharing, by the second data party, the respective values of the different terms in the polynomial expression comprises transmitting secret shares of the respective values of the different in the polynomial expression to the first data party at a second same time and without multiple exchanges with the first data party device.

6. A non-transitory, computer-readable medium storing one or more instructions executable by a computer system to perform operations comprising:
   determining, by a first data party device, respective values of first coefficients based on a first share of service data, wherein the first coefficients are corresponding coefficients of respective target variables in different terms of a polynomial expression, and the target variables are variables that are in the polynomial expression and associated with the first share of the service data;
   determining, by a second data party device, respective values of second coefficients based on a second share of the service data, wherein the second coefficients comprise coefficients of the target variables other than the first coefficients in the different terms of the polynomial expression, wherein the first coefficients are expressed in terms of multiple orders of the second coefficients and the second coefficients are expressed in terms of multiple orders of the first coefficients;
   secretly sharing, by the first data party device, respective values of the different terms in the polynomial expression in parallel based on the respective values of the first coefficients, and secretly sharing, by the second data party, the respective values of the different terms in the polynomial expression in parallel based on the respective values of the second coefficients, so that the first data party obtains first shares of the respective values of the different terms, and the second data party obtains second shares of the respective values of the different terms;
   determining, by the first data party device a first share of a value of the polynomial expression based on the first shares of the respective values of the different terms; and
   determining, by the second data party device, a second share of the value of the polynomial expression based on the second shares of the respective values of the different terms
   determining by at least one of the first party device or the second party device, the value of the polynomial expression based on the first share of the value of the polynomial expression and the second share of the value of the polynomial expression; and constructing a machine learning model by fitting an activation function of the machine learning model using the value of the polynomial expression.

7. The non-transitory, computer-readable medium of claim 6, wherein:

a sum of the first share of the service data and the second share of the service data is equal to the service data;

products of the first coefficients and the second coefficients of the different terms are equal to the different terms;

the sum of the first shares and the second shares of the respective values of the different terms is equal to the respective values of the different terms;

the sum of the first share and the second share of the value of the polynomial expression is equal to the value of the polynomial expression; and the polynomial expression comprises a plurality of terms, and target variables in different terms have different degrees.

8. The non-transitory, computer-readable medium of claim 6, wherein the activation function comprises a non-linear function.

9. The non-transitory, computer-readable medium of claim 6, wherein secretly sharing, by the first data party device, respective values of the different terms in the polynomial expression comprises transmitting secret shares of the respective values of the different in the polynomial expression to the second data party at a first same time and without multiple exchanges with the second data party device.

10. The non-transitory, computer-readable medium of claim 9, wherein secretly sharing, by the second data party, the respective values of the different terms in the polynomial expression comprises transmitting secret shares of the respective values of the different in the polynomial expression to the first data party at a second same time and without multiple exchanges with the first data party device.

11. A computer-implemented system, comprising:

one or more computers; and one or more computer memory devices interoperably coupled with the one or more computers and having tangible, non-transitory, machine-readable media storing one or more instructions that, when executed by the one or more computers, perform operations comprising:

determining, by a first data party device, respective values of first coefficients based on a first share of service data, wherein the first coefficients are corresponding coefficients of respective target variables in different terms of a polynomial expression, and the target variables are variables that are in the polynomial expression and associated with the first share of the service data;

determining, by a second data party device, respective values of second coefficients based on a second share of the service data, wherein the second coefficients comprise coefficients of the target variables other than the first coefficients in the different terms of the polynomial expression, wherein the first coefficients are expressed in terms of multiple orders of the second coefficients and the second coefficients are expressed in terms of multiple orders of the first coefficients;

secretly sharing, by the first data party device, respective values of the different terms in the polynomial expression in parallel based on the respective values of the first coefficients, and secretly sharing, by the second data party, the respective values of the different terms in the polynomial expression in parallel based on the respective values of the second coefficients, so that the first data party obtains first shares of the respective values of the different terms, and the second data party obtains second shares of the respective values of the different terms;

determining, by the first data party device a first share of a value of the polynomial expression based on the first shares of the respective values of the different terms; and determining, by the second data party device, a second share of the value of the polynomial expression based on the second shares of the respective values of the different terms determining by at least one of the first party device or the second party device, the value of the polynomial expression based on the first share of the value of the polynomial expression and the second share of the value of the polynomial expression; and constructing a machine learning model by fitting an activation function of the machine learning model using the value of the polynomial expression.

12. The computer-implemented system of claim 11, wherein:

a sum of the first share of the service data and the second share of the service data is equal to the service data;

products of the first coefficients and the second coefficients of the different terms are equal to the different terms;

the sum of the first shares and the second shares of the respective values of the different terms is equal to the respective values of the different terms;

the sum of the first share and the second share of the value of the polynomial expression is equal to the value of the polynomial expression; and the polynomial expression comprises a plurality of terms, and target variables in different terms have different degrees.

13. The computer-implemented system of claim 11, wherein the activation function comprises a non-linear function.

14. The computer-implemented system of claim 11, wherein secretly sharing, by the first data party device, respective values of the different terms in the polynomial expression comprises transmitting secret shares of the respective values of the different in the polynomial expression to the second data party at a first same time and without multiple exchanges with the second data party device.

15. The computer-implemented system of claim 14, wherein secretly sharing, by the second data party, the respective values of the different terms in the polynomial expression comprises transmitting secret shares of the respective values of the different in the polynomial expression to the first data party at a second same time and without multiple exchanges with the first data party device.

* * * * *

UNITED STATES PATENT AND TRADEMARK OFFICE
CERTIFICATE OF CORRECTION

PATENT NO. : 10,873,452 B1  
APPLICATION NO. : 16/792070  
DATED : December 22, 2020  
INVENTOR(S) : Yashun Zhou et al.

Page 1 of 1

It is certified that error appears in the above-identified patent and that said Letters Patent is hereby corrected as shown below:

In the Claims

Column 16/Line 17, In Claim 4, after "different" insert -- terms --.

Column 16/Line 24, In Claim 5, after "different" insert -- terms --.

Column 17/Line 30, In Claim 9, after "different" insert -- terms --.

Column 17/Line 38, In Claim 10, after "different" insert -- terms --.

Column 18/Line 53, In Claim 14, after "different" insert -- terms --.

Column 18/Line 60, In Claim 15, after "different" insert -- terms --.

Signed and Sealed this  
Fifteenth Day of February, 2022

Drew Hirshfeld  
*Performing the Functions and Duties of the*  
*Under Secretary of Commerce for Intellectual Property and*  
*Director of the United States Patent and Trademark Office*